No. 876,423. PATENTED JAN. 14, 1908.
F. E. ADAMS & C. W. KRAGH.
DEVICE FOR INDICATING THE POSITION OF WATER OR SLUICE GATE VALVES.
APPLICATION FILED SEPT. 7, 1905.

4 SHEETS—SHEET 1.

No. 876,423. PATENTED JAN. 14, 1908.
F. E. ADAMS & C. W. KRAGH.
DEVICE FOR INDICATING THE POSITION OF WATER OR SLUICE GATE VALVES.
APPLICATION FILED SEPT. 7, 1905.

4 SHEETS—SHEET 2.

WITNESSES=
A. K. Hood.
Frank G. Parker

INVENTORS=
Thomas E. Adams
Christian W. Kragh
By their Att'y.

No. 876,423. PATENTED JAN. 14, 1908.
F. E. ADAMS & C. W. KRAGH.
DEVICE FOR INDICATING THE POSITION OF WATER OR SLUICE GATE VALVES.
APPLICATION FILED SEPT. 7, 1905.

4 SHEETS—SHEET 4.

UNITED STATES PATENT OFFICE.

FRANCIS E. ADAMS, OF BOSTON, MASSACHUSETTS, AND CHRISTIAN W. KRAGH, OF MADISON, WISCONSIN, ASSIGNORS TO COFFIN VALVE COMPANY, A CORPORATION OF MASSACHUSETTS.

DEVICE FOR INDICATING THE POSITION OF WATER OR SLUICE GATE VALVES.

No. 876,423.　　　Specification of Letters Patent.　　　Patented Jan. 14, 1908.

Application filed September 7, 1905. Serial No. 277,456.

*To all whom it may concern:*

Be it known that we, FRANCIS E. ADAMS, a citizen of the United States, residing in Boston, in the county of Suffolk and State of Massachusetts, and CHRISTIAN W. KRAGH, a citizen of the United States, residing in Madison, in the county of Dane and State of Wisconsin, have invented a new and Improved Device for Indicating the Position of Water or Sluice Gate Valves, of which the following is a specification.

This is an indicator to be located at a distance (say the central station) from the gate-valve which regulates the flow of water, and electrically connected with said gate-valve—which may be, say two miles away—whereby the position of the valve, that is, the degree to which it is open, and its movements when wholly or partially opened or closed by a suitable motor, are indicated on a suitable dial or equivalent device. By this means the degree to which the gate-valve is open, and the extent to which it may be opening or closing by means of the action of a suitable motor, may be ascertained by glancing at the indicator at headquarters, without any necessity for an examination of the water-gate, which is commonly underground, or the sluice gate, as the case may be. By this means it is evident that a quick and accurate knowledge may be had at all times of the amount of water flowing through the valve, whereby it may be known what instructions are necessary to be given to the operator of the motor which controls and actuates the valve.

The nature of the invention is fully described in detail below, and illustrated in the accompanying drawings, in which:—

Figure 1:
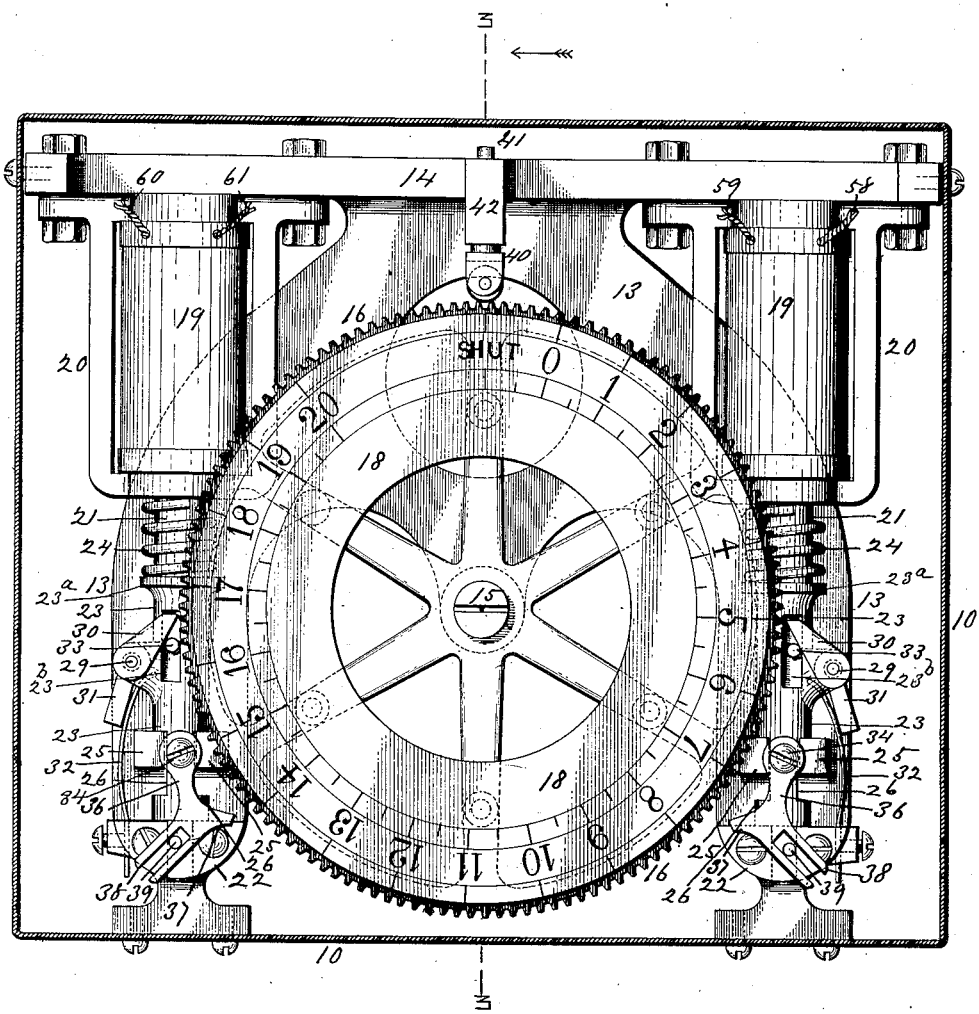
Figure 2:
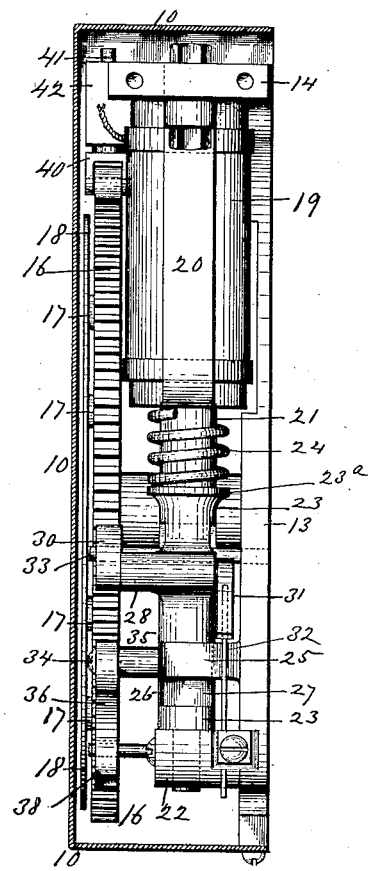
Figure 3:
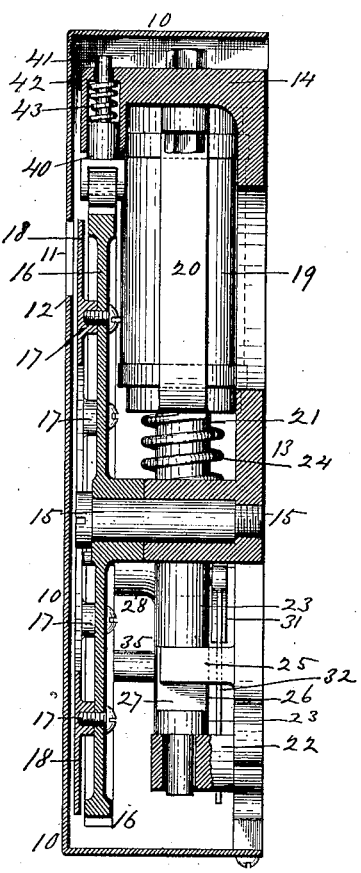
Figure 4:
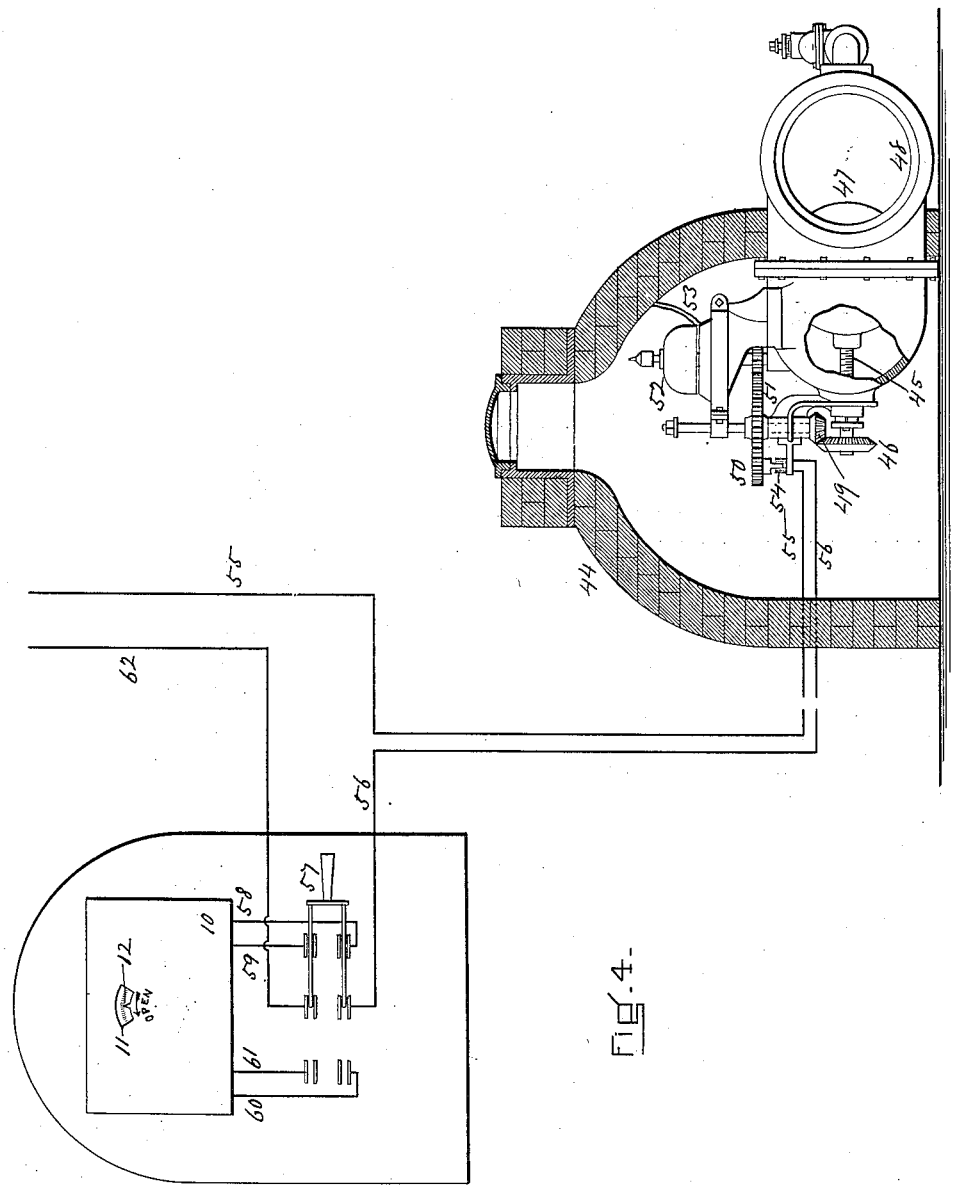
Figure 5:
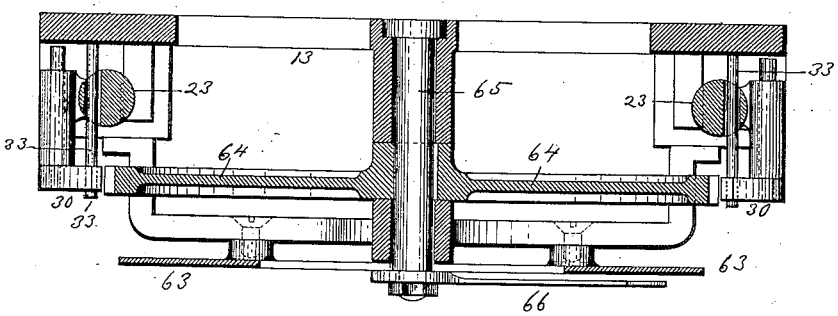
Figure 6:
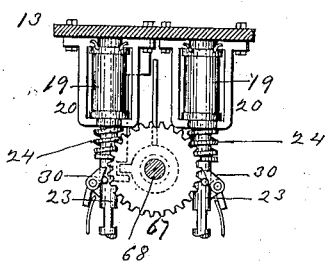
Figure 7:
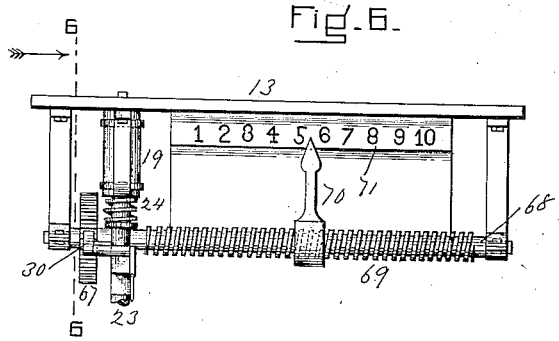

Figure 1 is an elevation of my improved indicator, with the case illustrated in section. Fig. 2 is a side elevation of the same looking toward the left, the case being shown in section. Fig. 3 is a cross vertical section taken on line 3—3, Fig. 1, looking toward the left. Fig. 4 is a diagrammatic view of the indicator and its electrical connection with a water gate-valve which is illustrated partly in elevation and partly in section. Fig. 5 is a horizontal section showing a modification. Fig. 6 is a section taken on line 6—6, Fig. 7. Fig. 7 is a side view showing a second modification.

Similar characters of reference indicate corresponding parts.

Inclosed in a suitable case 10 provided with an opening 11 (Figs. 3 and 4) whose lower edge is formed up into a pointer 12, is my indicating device, of which 13 is the vertical portion of the frame and 14 the upper and horizontal portion, preferably made of an integral casting.

Screwed into the portion 13 of the case is a stud 15 on which is mounted a gear wheel 16 which has bolted to it at 17 a dial 18, having inscribed on its face suitable figures or marks with relation to the teeth on the gear wheel. Marks are placed preferably next the periphery to indicate every sixth tooth, and another concentric row of marks indicates every third tooth. Any arrangement however of designating marks or characters may be employed. At one point on the dial appears the word "Shut." On opposite sides or edges of the dial and gear wheel, solenoids 19 are supported by hangers or brackets 20 extending down from the portion 14 of the frame. From each solenoid there extends downward a core 21 whose outer end is supported by a bracket 22 extending from the frame. Rigid on this core is an extension 23 between the annular flange 23ᵃ of which and the outer end of the hanger is a spiral spring 24 which holds the core normally downward and outward, the movement of said core and extension being limited by horizontal pins or stops 25 which extend through slots 26 in the extension across the flattened faces 27 thereof at that point. A horizontal tubular holder or bracket 28 is cast with the extension 23 and constitutes a bearing for the pin or shank 29 of the ratchet-pawl 30 which is adapted to engage and move the teeth of the gear wheel 16, said pin or shank being provided at its opposite end with the arm 31 which is held normally outward by the spring 32, thereby holding the ratchet-pawl to its work. The movement of the ratchet-pawl downward is limited by a pin 33 which extends horizontally from the frame 13 through a slot 23ᵇ in the extension 23. Below the ratchet-pawl a stud or screw 34 is supported in a suitable socket 35 which extends horizontally from the extension 23, and pivotally sustained by said stud is the elbow-shaped retaining pawl 36, the tooth portion 37 of which is adapted to engage with the gear wheel 16, while the bifurcated outer end 38 embraces a pin 39 which extends horizontally from the bracket 22, said pin and bifurcated portion 28 operating to swing the retaining pawl into engagement with the gear wheel and out of engagement therewith respectively as the core 21 is lifted and lowered. The solenoids and the above described parts connected with them on the opposite sides of the dial are exactly alike. A caster 40 has its shank 41 supported vertically in the bracket 42 which extends from the portion 14 of the frame over the gear wheel, and is pressed down upon the periphery of said wheel by means of the spring 43. See Figs. 1, 2 and 3. The object of this caster is to prevent the gear wheel from rotating more than one tooth at a time.

The above described indicator is usually located at the home office or at headquarters. At a distance or distances from the home office are one or more man-holes 44 (Fig. 4) which contain the gate-valves (not new in this invention), the mechanism of which needs no detailed description, but includes a screw 45 and bevel-gear 46 for operating the gate 47 in the joint 48 which connects with the water-pipe. A bevel-gear 49 engages the gear 46 and is operated by a gear wheel 50 which is engaged by a gear wheel 51 actuated by a suitable motor 52 electrically operated by means of wires 53 which lead to the source of electricity. The gear wheel 50 is adapted to be electrically connected by ordinary brushes 54 with the electric wires 55 and 56, the latter extending to a reversing switch 57 which is adapted to make contact with and close either of the two circuits which comprise the wires 58 and 59 leading to one solenoid and the wires 60 and 61 leading to the other solenoid. The main circuit of which the wire 55 is a part is completed by the wire 62 which leads to the battery.

It is evident that by operating the switch 57, the solenoid 19 in the circuit 60, 61 or that in the circuit 58, 59 may be energized as desired. If one of the solenoids is energized, the effect will be to rotate the dial 18 toward the left, while if the other is energized the dial will be rotated toward the right, such rotation being produced through the agency of the mechanism above described, the circuit through the wires 55 and 56 being opened and closed by the motor 52 and mechanism intermediate thereof and said wires. It being understood that the switch 57 and the wires 53 leading to the motor are under the control of the office or headquarters, or under orders therefrom, when the motor is operated to close or partially close the gate 47, the switch 57 energizes one of the solenoids and records the closing movement of the gate on the dial, and if the gate is to be opened wholly or partially by means of the motor, the switch 57 is placed in circuit with the other solenoid and the opening movement of the gate is indicated on the dial.

In operation, when one of the solenoids is energized as above described, the effect is to draw the core 21 into the solenoid against the power of the spring 24, carrying with it the extension 23 as far as the pins 25 in the slots 26 formed in said extension will allow. The extension in this movement toward the solenoid carries with it, of course, the holder or bracket 28 and the socket 35. The movement of the bracket causes the pawl 30 to engage a tooth on the gear wheel 16, being held to its work by the spring 32, rotating said gear and the dial 18 to the extent of one notch, the socket 35 causing the retaining pawl 36 to be guided at the proper time by the pin 39 into engagement with the teeth of said gear. As the core is forced out again into its normal position indicated in Figs. 1, 2 and 3, by the spring 24, the pin 33 disengages the pawl 30 from the gear wheel 16 and causes it to slip over the next tooth, the pin 39 guiding the pawl 36 out of engagement with the gear wheel. It is evident that the pawl 30 connected with the solenoid 19 on the left side in Fig. 1 will move the dial toward the right, indicating a closing movement on the part of the gate, and the pawl connected with the solenoid on the right side will move the dial toward the left indicating an opening movement of the gate, the figures or indicating marks on the dial showing through the opening 11 (Fig. 4) and being pointed out by the hand or pointer 12.

In the above description the mechanism imparts rotation to the dial, the pointer being stationary. It is evident that the dial may be stationary and the pointer rotated with exactly the same result, as in either case there is relative rotation between the pointer and the dial. In Fig. 5 a stationary dial 63 is represented, being rigid with and supported by the frame, while a gear wheel 64 is shown as rigid on a rotative shaft or stud 65 on the end of which is rigidly secured a pointer or hand 66.

In the modification illustrated in Figs. 6 and 7, a gear wheel 67 is adapted to rotate a shaft 68 provided with a screw-thread 69 which moves an indicating hand 70 over and along a stationary straight dial 71.

Having thus fully described my invention, what I claim, and desire to secure by Letters Patent, is:—

1. In a device for indicating the position of water or sluice gate-valves, a pair of solenoids provided with outwardly extending sliding cores; extensions rigid with said cores and extending downward or outward therefrom, the cores and extensions being held normally in such position by springs; tubular brackets rigid with said extensions; a dial and pointer or hand; a gear rigid with the dial; ratchet-pawls supported by said extensions and held normally against said gear; retaining pawls supported by said extensions and adapted to be moved into and out of engagement with said gear by the longitudinal reciprocation of the extensions; means for guiding and limiting the reciprocation of the extensions; means for energizing alternately the solenoids and thereby drawing the extensions toward said solenoids; a motor for opening or closing the gate; and an electrical connection between said solenoids and motor, for the purpose set forth.

2. In a device for indicating the position of water or sluice gate-valves, a pair of solenoids provided with outwardly extending sliding cores; the extensions 23 rigid with the cores and held normally downward or outward therefrom by springs and provided with slots 26 and flattened faces 27; stop-pins 25 extending from the frame into engagement with said slots; tubular brackets or holders 28 rigid with the extensions; a dial and pointer or hand; a gear rigid with the dial; ratchet-pawls pivotally supported by said brackets and held normally in engagement with the gear; elbow-shaped retaining pawls 36 pivotally supported by the extensions and provided with the bifurcated outer ends 38; pins extending from said brackets into engagement with the outer ends of the retaining-pawls; a motor for opening or closing the gate; and an electrical connection between said solenoids and motor whereby the solenoids may be energized separately and alternately and the gear which is rigid with the dial actuated by the mechanisms intermediate thereof and the solenoids alternately, for the purpose set forth.

In testimony whereof we have signed our names to this specification in the presence of the subscribing witnesses.

FRANCIS E. ADAMS.
CHRISTIAN W. KRAGH.

Witnesses for F. E. Adams:
E. J. CHADBOURNE,
A. B. PERRY.

Witnesses as to Christian W. Kragh:
L. O. SIMMONS,
D. H. SCHLEIGH,
WALTER T. COLQUITT.